No. 812,427. PATENTED FEB. 13, 1906.
H. KERNGOOD & H. A. TAYLOR.
WHEEL TIRE FOR AUTOMOBILES.
APPLICATION FILED JULY 3, 1905.
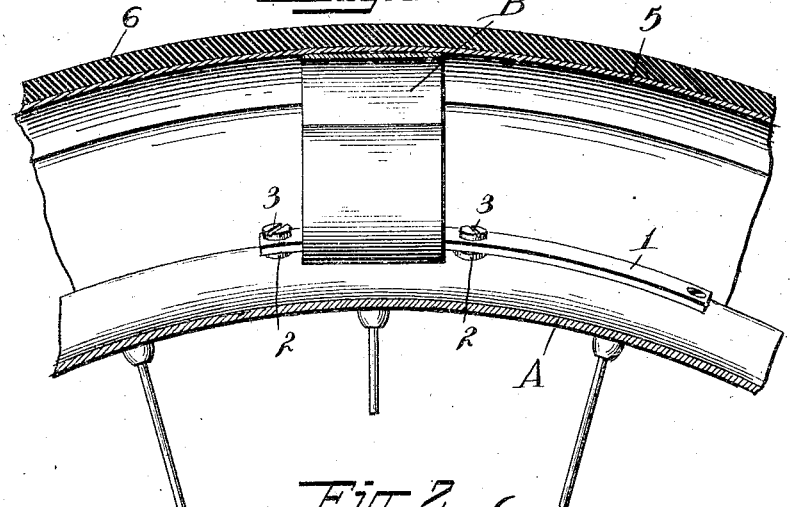
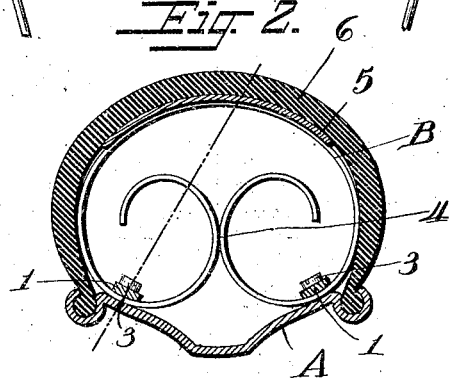
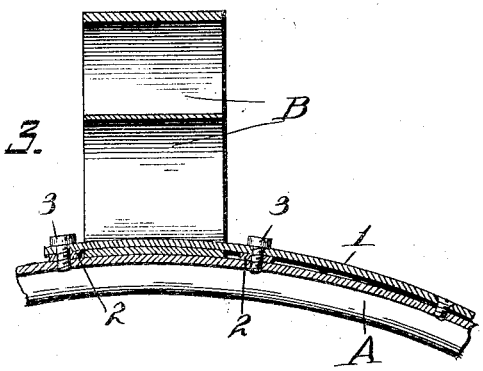

UNITED STATES PATENT OFFICE.

HERMAN KERNGOOD, OF BALTIMORE, MARYLAND, AND HARRY A. TAYLOR, OF NEW YORK, N. Y.

WHEEL-TIRE FOR AUTOMOBILES.

No. 812,427.  Specification of Letters Patent.  Patented Feb. 13, 1906.

Application filed July 3, 1905. Serial No. 268,198.

*To all whom it may concern:*

Be it known that we, HERMAN KERNGOOD, residing at Baltimore city, State of Maryland, and HARRY A. TAYLOR, residing at New York city, county and State of New York, citizens of the United States, have invented certain new and useful Improvements in Wheel-Tires for Automobiles, of which the following is a specification.

Our invention relates to an improvement in wheel-tires; and the object is to decrease the liability of the tires to be cut and afford at the same time a yielding compressible lateral internal support for the rubber tire.

With the foregoing object in view our invention consists in certain novel features of construction and combinations of parts which will be hereinafter described, and pointed out in the claim.

In the accompanying drawings, Figure 1 is a longitudinal section. Fig. 2 is a transverse section; and Fig. 3 is a section through one of the spring-holding strips and the edge of the rim, to which the same is attached.

A represents a metallic rim, more or less oval in cross-section, to which the spokes (not shown) are secured.

B is a convolute spring. This spring is made of comparatively thin steel with its ends bent in spiral form in opposite directions, the spring bridging over the space intervening between the edges of the rim with which the spring has sliding relation between the rim and the strips 1 1 of metal secured to the rim. The strips 1 1 are held removed from the rim a suitable distance by washers 2 2 or similar means to permit the spring to move freely in the space thus formed, screws 3 3 being employed to hold the strips securely in place. The parts of the spring preferably engage each other at the center, as shown at 4, whereby lateral support is afforded. As many of these springs are employed as may be required to afford support for the rubber tire, and they may be placed at suitable intervals apart for this purpose.

A steel strip 5, bent transversely to conform to the curvature of the springs, fits over the several springs, and the rubber tire 6 fits around this steel strip and the springs inclosing them and is secured at its edges in any convenient manner to the edges of the rim.

From the foregoing it will be seen that a simple means is provided for supporting and sustaining the weight applied upon the rubber tire, and means is provided for taking the lateral strain and pressure resulting from sudden turns which throws the weight laterally upon the tire, at the same time preventing undue wear and cutting of the tire. A wheel-rim of this character is elastic and resilient and instantly responsive to compression and strain and quickly resumes its normal condition upon the excessive strain or pressure being removed. Owing to the peculiar construction of the transverse convolute springs, there is no danger of their being collapsed or forced out of place, as the parts going to make them up coöperate in action and together and unitedly sustain all of the strain.

Slight changes might be resorted to in the form and arrangement of the several parts described without departing from the spirit and scope of our invention, and hence we do not wish to limit ourselves to the exact construction herein set forth; but, Having fully described our invention, what we claim as new, and desire to secure by Letters Patent, is—

The combination with a sheet-metal rim, strips secured to the rim with washers interposed between the strips and the rim, convolute springs extending transversely of the rim and having loose sliding connection between the rims and the strips, a transversely-bent strip 5 fitted over the several springs and a rubber tire inclosing said strip and springs and secured at its edges in edges of the rim.

In testimony whereof we affix our signatures in the presence of two witnesses.

HERMAN KERNGOOD.
HARRY A. TAYLOR.

Witnesses:
MARY M. MAGRAW,
LOUIS LEWINSOHN.